(12) United States Patent
Kellermann et al.

(10) Patent No.: US 10,602,530 B2
(45) Date of Patent: Mar. 24, 2020

(54) ACCESS METHOD WITH ACCESS SLOTS AND PRIORITY RESOLUTION

(71) Applicant: Bayerische Motoren Werke Aktiengesellschaft, Munich (DE)

(72) Inventors: Helmut Kellermann, Oberschleissheim (DE); Hyung-Taek Lim, Munich (DE); Thomas Gehrsitz, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 350 days.

(21) Appl. No.: 15/411,399

(22) Filed: Jan. 20, 2017

(65) Prior Publication Data

US 2017/0245293 A1 Aug. 24, 2017
US 2018/0049210 A9 Feb. 15, 2018

Related U.S. Application Data

(63) Continuation of application No. PCT/EP2015/066767, filed on Jul. 22, 2015.

(30) Foreign Application Priority Data

Jul. 23, 2014 (DE) .................. 10 2014 214 458
Jul. 21, 2015 (DE) .................. 10 2015 213 680

(51) Int. Cl.
*H04W 72/10* (2009.01)
*H04L 12/403* (2006.01)
(Continued)

(52) U.S. Cl.
CPC ......... *H04W 72/10* (2013.01); *H04L 12/4035* (2013.01); *H04L 12/40143* (2013.01);
(Continued)

(58) Field of Classification Search
None
See application file for complete search history.

(56) References Cited

U.S. PATENT DOCUMENTS 5,297,142 A * 3/1994 Paggeot ............ H04L 12/40006
370/461
6,111,888 A 8/2000 Green et al.
(Continued)

FOREIGN PATENT DOCUMENTS

DE 41 29 205 A1 10/1992
DE 197 21 740 A1 11/1998
(Continued)

OTHER PUBLICATIONS

PCT/EP2015/066767, International Search Report dated Oct. 19, 2015 (Three (3) pages).
(Continued)

*Primary Examiner* — Hassan A Phillips
*Assistant Examiner* — Gautam Sharma
(74) *Attorney, Agent, or Firm* — Crowell & Moring LLP

(57) ABSTRACT

A time-division multiplex method for serial data transmission includes executing a first priority resolution for messages to be transmitted by a plurality of stations on a communications channel and which are assigned to a first prefix, and transmitting a first data frame by a first station of the multiplicity of stations, wherein the first station transmits a first message with the first prefix and with the highest priority, during a predefined first access slot. The method also includes executing a second priority resolution for messages to be transmitted on the communications channel and which are assigned to a second prefix, and then transmitting of a second data frame by a second station of the plurality of stations, where the second station transmits a second message with the second prefix and with the highest priority of the second priority resolution, during a predefined second access slot.

17 Claims, 2 Drawing Sheets

(51) Int. Cl.
*H04L 12/413* (2006.01)
*H04L 12/40* (2006.01)
*H04W 72/04* (2009.01)

(52) U.S. Cl.
CPC .... *H04L 12/40156* (2013.01); *H04L 12/4135* (2013.01); *H04W 72/0446* (2013.01); *H04L 2012/40215* (2013.01); *H04L 2012/40273* (2013.01); *Y02D 70/10* (2018.01)

(56) References Cited

U.S. PATENT DOCUMENTS

| | | | | |
|---|---|---|---|---|
| 7,509,300 | B2* | 3/2009 | Sahni | H04L 45/00 |
| 2006/0045088 | A1* | 3/2006 | Nguyen | H04L 45/00 |
| | | | | 370/392 |
| 2006/0221956 | A1* | 10/2006 | Narayan | H04L 45/00 |
| | | | | 370/389 |
| 2007/0076655 | A1* | 4/2007 | Manjeshwar | H04J 3/1682 |
| | | | | 370/329 |
| 2008/0062975 | A1* | 3/2008 | Mes | G06F 13/385 |
| | | | | 370/389 |
| 2008/0134230 | A1* | 6/2008 | Kim | H04N 7/163 |
| | | | | 725/25 |
| 2008/0225836 | A1* | 9/2008 | Fuhrmann | H04L 47/10 |
| | | | | 370/352 |

FOREIGN PATENT DOCUMENTS

| | | |
|---|---|---|
| DE | 100 00 305 A1 | 7/2001 |
| DE | 698 07 235 T2 | 12/2002 |
| DE | 10 2012 204 536 A1 | 5/2013 |
| DE | 10 2012 200 475 A1 | 7/2013 |
| EP | 2 421 204 A2 | 2/2012 |
| WO | WO 93/02512 A1 | 2/1993 |
| WO | WO 2012/171586 A1 | 12/2012 |

OTHER PUBLICATIONS

German Search Report issued in German counterpart application No. 10 2014 214 458.2 dated Jan. 22, 2015, with Statement of Relevancy (Ten (10) pages).

German Search Report issued in German counterpart application No. 10 2015 213 680.9 dated Sep. 22, 2015, with Statement of Relevancy (Eleven (11) pages).

* cited by examiner

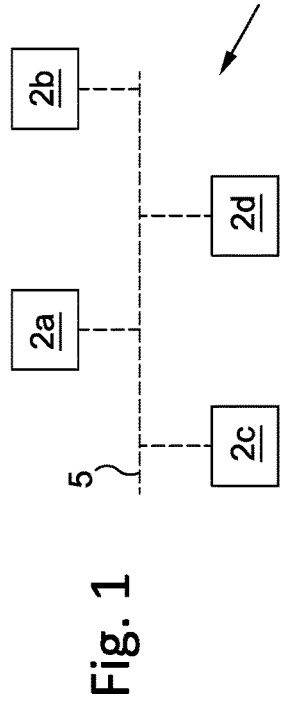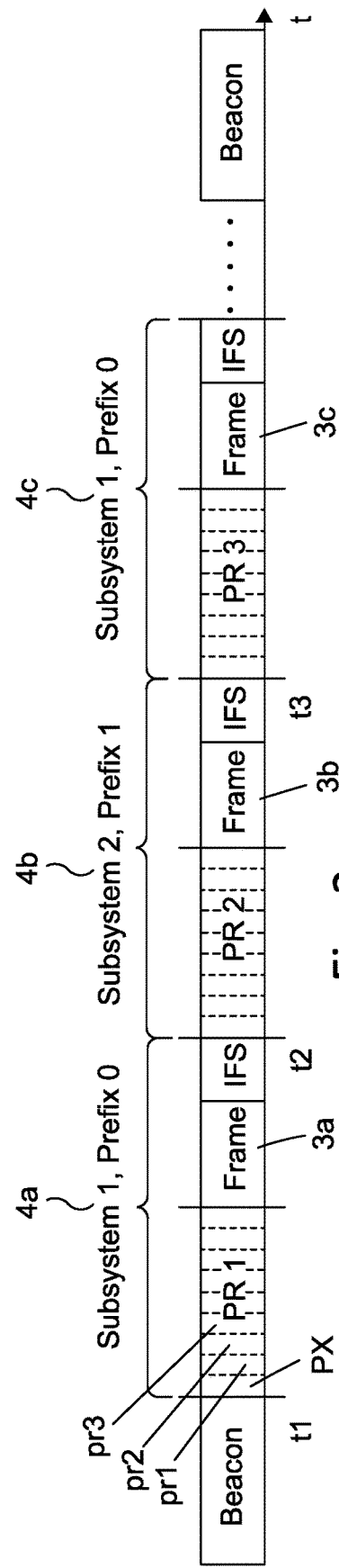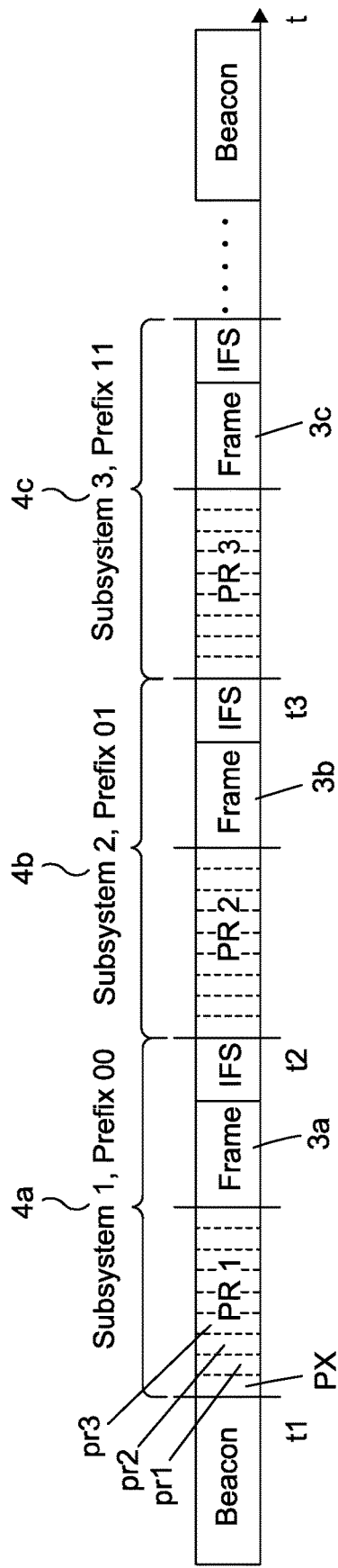

ACCESS METHOD WITH ACCESS SLOTS AND PRIORITY RESOLUTION

CROSS REFERENCE TO RELATED APPLICATIONS

This application is a continuation of PCT International Application No. PCT/EP2015/066767, filed Jul. 22, 2015, which claims priority under 35 U.S.C. § 119 from German Patent Application No. 10 2014 214 458.2, filed Jul. 23, 2014, and 10 2015 213 680.9, filed Jul. 21, 2015, the entire disclosures of which are herein expressly incorporated by reference.

BACKGROUND AND SUMMARY OF THE INVENTION

The invention relates to a method for transmitting data by means of data frames in a communications network having a multiplicity of stations, in particular a time-division multiplex method (TDMA).

The number of electronic systems in motor vehicles has increased greatly in the last decades. Therefore, the technical devices of the motor vehicle have come to have a multiplicity of electronic systems which control the motor vehicle and which to a certain extent replace mechanical systems.

Since in the case of conventional cabling a line is required for each information item, as the functional scope of motor vehicle electronics increases, the length and the weight of the cable harness as well as the number of connections at the control devices increase. Until now, this has been remedied by a data bus, in particular a CAN bus (Controller Area Network), which transmits all the information over two lines. Such a data bus connects to one another a multiplicity of control devices which cooperate in a vehicle. In this context, the connected control devices can exchange information with one another via the data bus. In order to transmit data, the individual control devices are interconnected to one another in the bus system. If a station or a control device transmits information into the bus system by means of a data frame, other stations or control devices can monitor or "listen into" this information. Stations for which the information in the data frame is relevant will use said information, and other stations ignore these data frames.

With the progressive increase in control devices which are intended to communicate via the bus systems which are present in the motor vehicle, said devices being, in particular, from the fields of telematics, media and audio and the automation of the vehicle, the problem arises that ever greater data volumes and therefore more and more data frames are to be transmitted over the existing bus systems. Owing to the serial method of transmission, this often results in overloading or a "traffic jam" in the data traffic of such a communications network.

Independently of this, in view of economic and ecological criteria, in particular against the background of increasing electrification of the drive system of the motor vehicles, there is a desire on the part of vehicle manufacturers to save weight in the motor vehicles and to combine existing bus systems or even to use the power lines, which serve to supply power to the stations or control devices, as a bus system, i.e. to use by means of this power supply what is referred to as a PowerLAN, also known as dLAN (direct LAN) or powerline communication (PLC), in particular according to the IEEE standard 1901.

This standard uses a multi-access with carrier checking and collision avoidance method (CSMA/CA), for example, as access method. In this method, collisions may occur during the transmission of data frames. In contrast, if time-division multiplex methods (TDMA) are used, there is the disadvantage that they are inflexible owing to the fixed apportioning of the time access slots at stations, because the apportioning of the access slots usually takes place in a statically or centrally coordinated fashion.

DE 4 129 205 A1 relates to a method for setting up messages for the exchange of data and/or for the synchronization of processes in data processing systems, wherein a message comprises at least one element or start bit field (SOF), identification and data, wherein a bit field (IDE-field, IDE-bit) which has at least one bit is provided for characterizing the length of the identifier.

DE 69 807 235 T2 relates to a method for reducing the number of communications which is necessary for the transmission of communications in a deterministic fashion between a plurality of nodes, which are communicatively connected by a bus using the controller area network (CAN) serial communications protocol.

DE 197 21 740 A1 relates to a control method in a serial bus having a plurality of users. The individual users communicate via data telegrams which each contain at least the address of the addressed user as a destination address and the address of the transmitting user as a source address. In order to allow individual users to access the bus at specific times, trigger telegrams are transmitted cyclically by a first user embodied as a master.

DE 100 00 305 A1 relates to a method and a device for exchanging data and communications between at least two users which are connected by means of a bus system, wherein the communications containing data are transmitted through the bus system by the users, and each communication contains an identifier which characterizes the data contained in it, wherein each user decides on the basis of the identifier whether it receives the communication.

U.S. Pat. No. 6,111,888 relates to a device and a method for performing deterministic communication between a plurality of nodes in a way which corresponds to the controller area network (CAN) communications protocol. The system uses standard CAN error checking, bus arbitration and communication formatting. A node on the bus is selected as a master node. The master node outputs periodic synchronization signals which define the time divisions during which the operation of each node and communication over the CAN bus are organized.

DE 10 2012 204 536 A1 relates to a network and to a method for transmitting data over a common transmission medium with a plurality of users. The transmission of data takes place in at least one transmission cycle with an adjustable duration, wherein each transmission cycle is divided at least one first time domain with synchronous media access method and at least one second time domain with asynchronous media access method. In the first time domain, each authorized user which transmits in the second time domain is assigned a time slot in which it transmits, where necessary, a media access request for a communication to be transmitted in the second time domain.

DE 10 2012 200 475 A1 relates to a transmission/reception node with an interface for producing a connection to a Flex-RAY or Ling data bus, wherein the transmission/reception node is designed to detect the occurrence of a first condition and of a second condition during a sequence of time periods, and, if the first and the second condition for an assigned time period are met, to provide the Flex-RAY or Ling data bus during the assigned time period with a frame of an available communication via the interface.

Against the background of this prior art, an object of the invention is to specify an improved, in particular flexible, collision-free and deterministic access method for serial data transmission.

A first aspect of the invention relates to a method for serial data transmission by means of data frames in a communications network having a multiplicity of stations, in particular a time-division multiplex method, which during communication of the multiplicity of stations preferably comprises the following working steps: executing a first priority resolution for messages which are to be transmitted by the multiplicity of stations on a communications channel and which are assigned to a first prefix; transmitting of a first data frame by a station of the multiplicity of stations, which station has to transmit a first message with the first prefix and with the highest priority, during a predefined first access slot; executing a second priority resolution of messages which are to be transmitted by the multiplicity of stations on the communications channel and which are assigned to a second prefix; and transmitting of a second data frame by a station of the multiplicity of stations, which station has to transmit a second message with the second prefix and with the highest priority of the second priority resolution, during a predefined second access slot, wherein a time of a start of the first priority resolution in the time of a start of the second priority resolution are predetermined.

A second aspect of the invention relates to a method for serial data transmission by means of data frames in a communications network having a multiplicity of stations, in particular a time-division multiplex method (TDMA) and preferably has the following working steps: executing a first priority resolution for messages which are to be transmitted by the multiplicity of stations on a communications channel; transmitting of a first data frame by a first station, which station has to transmit a first message with the highest priority, during a predefined first access slot; and executing a second priority resolution of messages which are to be transmitted on the communications channel by the multiplicity of stations, wherein the time of a start of the first priority resolution and of a start of the second priority resolution is predetermined.

A data frame in the sense of the invention is a data unit of a protocol. A data frame is preferably composed of destination addresses and source addresses, control information for data flow control, useful data of a data packet and/or of a checksum for ensuring the data integrity.

A priority resolution in the sense of the invention comprises examining individual messages with respect to a predefined priority of the data frame which is to be transmitted with this message, and identifying the data frame with the highest priority or preferably the priority gradation between a multiplicity of data frames or the messages which each have a data frame.

A station in the sense of the invention is a participant in a communication in a communications network.

A communications channel in the sense of the invention is a transmission medium which can be used jointly by a multiplicity of stations.

The invention is based, in particular, on the approach of providing access slots such as those which are used in the time-division multiplex method and which are predefined chronologically in a communication method and a priority resolution such as used in the case of multiple access with carrier checking and collision-resolution methods (CSMA/CR), the access slots additionally with a prefix which denotes, in particular, a subsystem of the communications network, and of assigning the messages which are to be transmitted by the individual stations each to at least one of the possible prefixes or one of the subsystems.

The prefix is preferably a property of a message which is known to the message-transmitting station. Alternatively or additionally, the prefix can preferably be determined by means of the type of the respective message, i.e. intrinsically defined or else specified by means of meta data which, however, are not part of the message and/or of the data frame to be transmitted. Alternatively, prefixes are preferably formed by one or more bits which precede the priority resolution of a message and are arranged (logically), in particular, at the start of the priority resolution space. In this context, messages with a defined prefix can be transmitted only in time slots or subsystems with the same prefix.

If time slots of various subsystems are transmitted, for example, alternately and if there are a total of two prefixes or subsystems, a message with a defined prefix can be transmitted, for example, only in every second time slot.

For messages which have the same prefix and are available for transmission simultaneously by one or more stations, in each case a priority resolution is then also additionally executed. The introduction of the prefixes or subsystems shortens the duration of the priority resolution during the serial data transmission according to the invention.

If, for example, a bit of a priority resolution space of a message is replaced by a prefix, in statistical terms only half of the messages undergo priority resolutions during the communication compared with a communication without the use of prefixes or of subsystems.

In the case of prefixes with more bits, the number of messages undergoing a priority resolution is respectively reduced by a ratio of $2^n$. As a result, stations can switch off their transceiver in those time periods or time slots which are associated with subsystems or have prefixes for which the stations do not have any messages or frames to transmit or for which they do not expect any message or frames. In this way, according to the invention the energy consumption can be reduced with the introduction of subsystems or prefixes, and the duration of the priority resolution can be shortened.

If the prefix is not part of the message to be transmitted, the bit length of the message is additionally reduced, with the result that the data set which is to be effectively transmitted in the communications network can also be reduced.

The access method according to the invention permits, in particular, on the one hand a collision-free and deterministic access to a communications channel, with the result that successful reception does not have to be acknowledged by means of confirmation (ACK). Given a comparable overhead to a CSMA method, the traffic on the communications channel is significantly reduced in that no ACK messages have to be transmitted. However, at the same time the requirement of a station to transmit a large number of data frames in a short time can be taken into account by selecting a correspondingly high priority for the transmission of this data frame or these data frames. The priority resolution ensures here that precisely only one station ever accesses the communications channel.

A further advantage of the access method according to the invention is that dynamic assignment of the imminent transmission, for example by a master station or master node, is eliminated and therefore there is a saving in terms of communication over the communications channel, and therefore in terms of transmission capacity. If a message has a particular urgency, it can also be provided in a flexible way with a new prefix in order to ensure transmission as soon as possible. This does not require any re-configuration of the communications network, for example by the master station or by a master node.

In one advantageous refinement of the method according to the invention, the latter also comprises the following working steps: executing at least one further priority resolution by the multiplicity of stations of messages which are to be transmitted on the communications channel and which are assigned to a third prefix or a fourth prefix; and transmitting of a further data frame by a station of the multiplicity of stations, which station has to transmit a further message with the third prefix or with the fourth prefix and with the highest priority of the further priority resolution, during a predefined further access slot, wherein the time of a start of the further priority resolution is predetermined.

As a result of the provision of further prefixes and subsystems, the number of messages for which a priority resolution is carried out can be reduced further. The duration for which stations which are activated and which do not have a message to transmit with corresponding prefixes or in the corresponding subsystems can also be made longer.

In one advantageous refinement of a method according to the invention, said method also comprises the working step of transmitting of a second data frame by a second station which has to transmit a second message with the highest priority of the second priority resolution, during a predefined second access slot. Furthermore, the method preferably comprises the working step of executing at least one further priority resolution of messages which are to be transmitted on the communications channel by the multiplicity of stations, wherein the time of the start of a second priority resolution and of the start of a further priority resolution is predetermined.

The working steps of the method can fundamentally be executed as long as a communication between the multiplicity of stations persists and/or the communications channel is activated.

In a further advantageous refinement of a method according to the invention, the times of the start of the respective priority resolution are predetermined as absolute times.

As a result of the time of the respective priority resolution being predetermined, each station knows when it has to begin with a priority resolution without a message for coordination having to be transmitted via the communications channel for this.

In a further advantageous refinement of a method according to the invention, the duration between the start of a preceding priority resolution and a subsequent priority resolution is predetermined and corresponds, in particular, to the length of the respective access slot.

The length of the access slots can be changed according to requirements through the determination of the duration between the respective priority resolutions, for example by means of an information item which is contained in an access slot.

In a further advantageous refinement of a method according to the invention, all the access slots have the same length.

As a result, it can be ensured that, even if stations do not follow the communication, i.e. do not listen into the communication, they can identify when the next priority resolution starts even if no absolute times are predefined.

In a further advantageous refinement of a method according to the invention, messages in the sense of the invention, in particular the first message, have a priority resolution space and a data frame, wherein the data frame is preferably arranged after the priority resolution space.

In a further advantageous refinement of the method according to the invention, the data set of the data frame is selected in such a way that the transmission of the message is shorter than the first access slot.

In a further advantageous refinement of a method according to the invention, access slots have an interframe space during which no station transmits, wherein the interframe space is arranged after the data frame or before the priority resolution space and provides sufficient time for stations which are participating in the communication to be able to switch from reception to transmission and, if appropriate, for internal processing to be able to be performed in the stations.

In a further advantageous refinement of a method according to the invention, the latter also comprises the working step of entering of the other of the multiplicity of stations into a waiting state in which they preferably do not transmit.

As a result of the entering into the waiting state, the stations can save energy which is advantageous, in particular, when they are operated with an accumulator mode.

In a further advantageous refinement of a method according to the invention, in the waiting state at least one station of the other of the multiplicity of stations does not monitor the communication on the communications channel.

As a result of this, it is also possible in the case of stations which did not play a role in the transmission but which are nevertheless not interested in the communication to save energy.

In a further advantageous refinement of a method according to the invention, the latter also has the working step of ending of the waiting state of the other of the multiplicity of stations before the start of the priority resolution of the following access slot.

This ensures that, if messages of the stations which are in the waiting state are to be transmitted, the respective stations participate in the next priority resolution.

In a further advantageous refinement of a method according to the invention, the priority resolution space has priority resolution slots, in particular dominant or recessive signals, preferably bits, and the method also has the working step of determining the number of messages to be transmitted in the communications network. Furthermore, the method preferably has the working step of defining the number of priority resolution slots on the basis of the maximum number of messages to be transmitted.

This can ensure that the priority resolution space is only as large as is absolutely necessary and consequently not too much time is taken up on the communications channel.

In a further advantageous refinement of a method according to the invention, each access slot is assigned to a subsystem of a multiplicity of subsystems in a previously defined sequence, wherein each subsystem of the multiplicity of subsystems is in turn assigned at least one prefix of a multiplicity of prefixes, and wherein only those messages which are assigned to the prefix of the subsystem of a time slot can be transmitted during the time slot.

In a further advantageous refinement of a method according to the invention, the respective prefix is a property of a message which is known exclusively to that one station of the multiplicity of stations which has to transmit the message.

In a further advantageous refinement of a method according to the invention, the respective prefix is an intrinsic property of the message.

In a further advantageous refinement, a message has the respective prefix, in particular the respective prefix occupies at least one bit of the message and is preferably arranged before the priority resolution space.

In a further advantageous refinement of a method according to the invention, there are $2^n$ subsystems and/or prefixes, wherein n is a natural number.

In a further advantageous refinement of a method according to the invention, the number of subsystems is defined before the execution of the first priority resolution, in particular as a function of the number of stations which participate in the communication.

Further features, advantages and application possibilities of the invention arise from the following description in connection with the figures, of which:

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 shows a partially schematic illustration of a communications network in which the method according to the invention is applied;

FIG. 2 shows a partially schematic illustration of a first embodiment of a communications protocol of the method according to the invention for transmitting data;

FIG. 3 shows a partially schematic illustration of a second embodiment of a communications protocol of the method according to the invention for transmitting data.

DETAILED DESCRIPTION OF THE DRAWINGS

Figure 4:
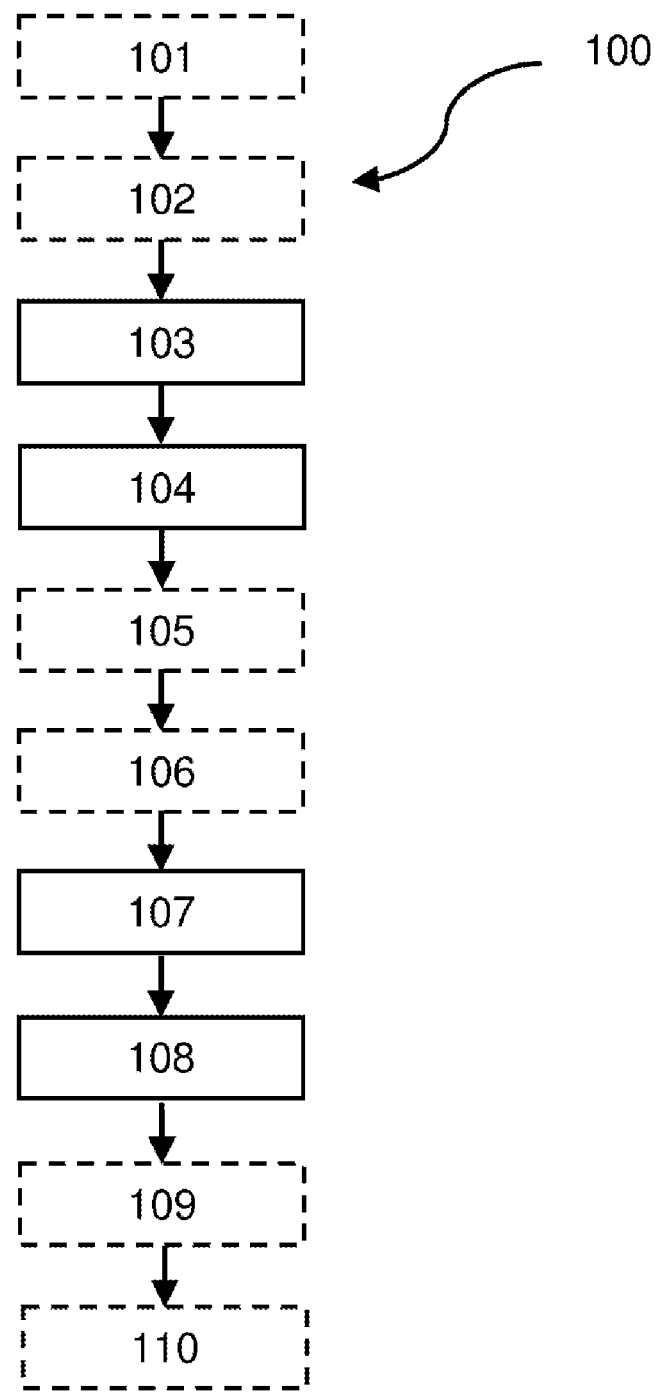
FIG. 4 shows a partially schematic block diagram of an embodiment of the method according to the invention for transmitting data.

FIG. 1 shows an example of a communications network in which the method according to the invention for serial data transmission is preferably used. This communications network preferably has a first station 2a, a second station 2b and further stations 2c and 2d. The communications network is preferably a communications network of a vehicle, in particular of a motor vehicle, and the stations 2a, 2b, 2c, 2d are control devices which control various functions for the driving mode or other functions of the vehicle. The individual stations 2a, 2b, 2c, 2d are preferably connected via a communications channel 5 for transmitting data. The communications network is preferably a WLAN network, a CAN network, a power LAN network, a radio network or the like, with the result that the communications channel can be, on the physical level, wire-bound, by radio, optical or else acoustic.

FIG. 2 shows a time sequence of a first embodiment of a communications protocol of the method according to the invention for serial data transmission. A communication is preferably respectively initiated and terminated here by a beacon.

Chronologically successive access slots 4 are arranged between these beacons, and in this context FIG. 2 illustrates a first access slot 4a, a second access slot 4b and a third access slot 4c. Access slots 4 preferably each contain in this case a priority resolution space, which is in turn divided into priority resolution slots pr1, pr2, pr3 . . . which are formed, in particular, by at least one bit. The priority resolution space serves to perform priority resolution between messages of various stations 2a, 2b, 2c, 2d, the transmission of which is to be started simultaneously on the communications channel 5.

By means of dominant and recessive signals, which are each assigned to a priority resolution slot pr1, pr2, pr3, . . . , each individual station 2a, 2b, 2c, 2d preferably detects whether it may transmit its respective data frame.

If a station 2a, 2b, 2c, 2d in one of the priority slots pr1, pr2, pr3, . . . determines that there is the message of another station 2a, 2b, 2c, 2d with a relatively high priority, the first station 2a preferably breaks off the transmission and continues to monitor the communications channel 5. Said station 2a can preferably also drop into a quiescent state and preferably wake up again only for the next relevant priority resolution.

The first bit PX of the priority resolution space PR1, PR2, PR3 is preferably reserved for a prefix 0, 1; 00, 01, 10, 11 which denotes a subsystem of time slots 4a, 4b, 4c, . . . during which the corresponding message can be transmitted. As an alternative to a bit PX, the prefix 0, 1; 00, 01, 10, 11 of a respective message which is to be transmitted can also be known only to the emitting station, can be an intrinsic property of the message or can be assigned thereto as meta data which are not transmitted.

The communication method according to the invention can have preferably $2^n$ subsystems here, wherein n is a natural number and specifies the number of bits PX of the prefix 0, 1; 00, 01, 10, 11. If a bit PX is provided (n=1), the prefix can preferably assume the values 0 and 1. If two bits are provided (n=2), the prefix can preferably assume the values 00, 01, 10 and 11.

The time slots 4a, 4b, 4c, . . . which are assigned to the respective subsystem can be arranged here in any desired sequence, for example alternately during the communication method. The sequence of the subsystems is preferably defined before a communication, more preferably as a function of the number of stations participating in a communication.

Preferably in each case at least one data frame 3a, 3b, 3c is arranged after the priority resolution space PR1, PR2, PR3, . . . in the messages of the stations 2a, 2b, 2c, 2d. This data frame 3a, 3b, 3c contains a data packet which is to be transmitted over the communications channel 5. The cumulative duration of the priority resolution space and of the frame must be shorter here than a time slot 4a, 4b, 4c, wherein in a time slot there is preferably a further interframe space (IFS) which preferably contains a checksum and/or serves to enable the stations 2a, 2b, 2c, 2d to change over from the reception mode for monitoring the communications channel 5 to a transmission mode for executing a recent priority resolution, i.e. for transmitting the dominant or recessive signals.

The sequence of time slots 4a, 4b, 4c illustrated in FIG. 2 is an alternating mode, wherein a first time slot 4a is followed by a second time slot 4b and subsequently in turn by a third time slot 4c, which is in turn assigned to the first subsystem, as is the first time slot 4a. However, any other sequences are also possible.

FIG. 3 illustrates a time sequence of a second embodiment of a communications protocol of the method according to the invention for serial data transmission. A communication is also preferably initiated and terminated here by a beacon. The embodiment illustrated in FIG. 3 differs from that in FIG. 2 essentially in that not two but rather at least three subsystems with prefixes 00, 01 and 11 are used and each have one of the time slots 4a, 4b, 4c assigned to them.

FIG. 4 shows a partially schematic block diagram of an inventive method 100 for serial data transmission. Optional working steps of the advantageous refinements are preferably illustrated by dashed lines. The sequence is in this case preferably as illustrated, but can also deviate therefrom.

The access mechanism of the method 100 according to the invention implements collision resolution based on priorities. The mechanism is comparable here with the access method of the CAN bus, a CSMA method, in particular CSMA-CR method. A difference however is that the transmission time is additionally divided into fixed access slots, as in a TDMA method. A further difference is that prefixes 0, 1; 00, 01, 10, 11 are provided which serve to reduce the stations participating in a priority resolution.

The stations can preferably start a transmission in each case only ever at the start of an access slot 4a, 4b, 4c, wherein the starting times t1, t2, t3 . . . of the respective access slots 4a, 4b, 4c are preferably either permanently defined as absolute times or are respectively defined in relation to the previous start of an access slot 4a, 4b, 4c. This is necessary since all the stations which wish to transmit a data frame must start simultaneously with the execution 103 of a priority resolution.

The execution 103 of a priority resolution is preferably followed by the transmission 104 of a data frame by one of the stations 2a, 2b, 2c, 2d. As a result of the priority resolution, it is ensured here that only precisely one station, e.g. the first station 2a, ever accesses the communications channel 5 in order to transmit a data frame, for example the first data frame 3a. In order to define the number of priority resolution slots 102, it can preferably be provided that the number of stations 2a, 2b, 2c, 2d in the communications network 5 is determined in advance 101.

During the transmission of the data frame, those stations which are not involved in the communication can preferably enter a waiting state 105. This is preferably ended 106 before the start of the priority resolution of the following access slot 4a, 4b, 4c. Stations with messages to be transmitted with different prefixes 0, 1; 00, 01, 10, 11 than the currently present prefix 0, 1; 00, 01, 10, 11 can preferably already enter a quiescent state before the priority resolution, or do not need to be woken up from said state.

After an interframe space (IFS), a further second priority resolution 107 starts between the stations 2a, 2b, 2c, 2d which access the communications channel 5. These steps are repeated as long as a communication persists between the stations 2a, 2b, 2c, 2d on the communications channel 5.

The times of the start of the first and second priority resolutions and further priority resolutions t1, t2, t3 . . . are preferably predetermined, with the result that all the stations 2a, 2b, 2c, 2d always start a priority resolution at the same time.

The method according to the invention preferably also comprises the working steps of determining 101 the individual stations in the communications network and of defining 102 the number of priority resolution slots pr1, pr2, pr3, . . . on the basis of the maximum number of communications to be transmitted. The other of the multiplicity of stations 2b, 2c, 2d, . . . preferably enter a waiting state in which they do not transmit essentially at the same time as the transmission 104 of a first data frame by the first station 2a. More preferably, in the waiting state this multiplicity of stations 2b, 2c, 2d, . . . does not monitor the communication on the communications channel. This waiting state is preferably ended 106 before a further priority resolution is executed at the start of the following access slot.

| List of reference symbols | |
|---|---|
| Communications network | 1 |
| Stations | 2a, 2b, 2c, 2d |
| First data frame | 3a |
| Second data frame | 3b |
| Third data frame | 3c |
| First access slot | 4a |
| Second access slot | 4b |
| Third access slot | 4c |
| Communications channel | 5 |
| Time of first priority resolution | t1 |
| Time of second priority resolution | t2 |
| Time of third priority resolution | t3 |
| Priority resolution space | PR |
| Interframe space | IFS |
| Priority resolution slot | pr1, pr2, pr3 |
| Prefix | 0, 1; 00, 01, 10, 11 |
| Prefix bit | PX |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A time-division multiplex method for serial data transmission using data frames in a communications network having a plurality of stations wherein, during communication of the plurality of stations, the method comprises the acts of:
   executing a first priority resolution for messages to be transmitted by the plurality of stations on a communications channel and which are assigned to a first prefix;
   transmitting a first data frame by a first station of the plurality of stations, wherein the first station is configured to transmit a first message with the first prefix and with the highest priority, during a predefined first access slot;
   executing a second priority resolution for messages to be transmitted by the plurality of stations on the communications channel and which are assigned to a second prefix; and
   transmitting of a second data frame by a second station of the plurality of stations, wherein the second station is configured to transmit a second message with the second prefix and with the highest priority of the second priority resolution, during a predefined second access slot,
   wherein a time of a start of the first priority resolution and a time of a start of the second priority resolution are predetermined, and
   wherein messages to be transmitted by the plurality of stations each have a priority resolution space and a data frame, wherein the data frame is arranged after the priority resolution space.

2. The method as claimed in claim 1, further comprising the acts of:
   executing at least one further priority resolution for messages to be transmitted by the plurality of stations on the communications channel and which are assigned to a third prefix or a fourth prefix; and
   transmitting a further data frame by a further station of the plurality of stations, wherein the further station is configured to transmit a further message with the third prefix or with the fourth prefix and with the highest priority of the further priority resolution, during a predefined further access slot, wherein the time of a start of the further priority resolution is predetermined.

3. The method as claimed in claim 1, wherein the times of the start of the respective priority resolution are predetermined as absolute times.

4. The method as claimed in claim 1, wherein the duration between the start of a priority resolution and a subsequent priority resolution is predetermined and corresponds to a length of a respective access slot.

5. The method as claimed in claim 4, wherein the predefined first access slot and the predefined second access slot have the same length.

6. The method as claimed in claim 1, wherein a data set of the data frames is selected such that the transmission duration of the messages is shorter than the access slots.

7. The method as claimed in claim 6, wherein the predefined first access slot and the predefined second access slot each have an interframe space during which no station transmits, wherein the interframe space is arranged after the data frame or before the priority resolution space.

8. The method as claimed in claim 1, wherein after the first priority resolution, the method further comprises:
entering, by other of the plurality of stations, into a waiting state in which such other plurality of stations do not transmit.

9. The method as claimed in claim 8, wherein, in the waiting state, at least one of the other of the plurality of stations does not monitor the communication on the communications channel.

10. The method as claimed in claim 8, further comprising:
ending the waiting state of the other of the plurality of stations before the start of the priority resolution of the following access slot.

11. The method as claimed in claim 1, wherein the priority resolution space has priority resolution slots, in particular dominant or recessive signals, preferably bits, and wherein the method also has the following working steps:
determining the number of stations in the communications network; and
defining the number of priority resolution slots on the basis of the maximum number of communications to be transmitted.

12. A time-division multiplex method for serial data transmission using data frames in a communications network having a plurality of stations wherein, during communication of the plurality of stations, the method comprises the acts of:
executing a first priority resolution for messages to be transmitted by the plurality of stations on a communications channel and which are assigned to a first prefix;
transmitting a first data frame by a first station of the plurality of stations, wherein the first station is configured to transmit a first message with the first prefix and with the highest priority, during a predefined first access slot;
executing a second priority resolution for messages to be transmitted by the plurality of stations on the communications channel and which are assigned to a second prefix; and
transmitting of a second data frame by a second station of the plurality of stations, wherein the second station is configured to transmit a second message with the second prefix and with the highest priority of the second priority resolution, during a predefined second access slot,
wherein a time of a start of the first priority resolution and a time of a start of the second priority resolution are predetermined,
wherein each access slot is assigned to a subsystem of a plurality of subsystems in a previously defined sequence, wherein each subsystem of the plurality of subsystems is assigned at least one prefix of a plurality of prefixes, and wherein only those messages which are assigned to the prefix of the subsystem of a time slot can be transmitted during the time slot.

13. The method as claimed in claim 12, wherein there are $2^n$ subsystems of the plurality of subsystem and $2^n$ prefixes in the plurality of prefixes, wherein n is a natural number.

14. A time-division multiplex method for serial data transmission using data frames in a communications network having a plurality of stations wherein, during communication of the plurality of stations, the method comprises the acts of:
executing a first priority resolution for messages to be transmitted by the plurality of stations on a communications channel and which are assigned to a first prefix;
transmitting a first data frame by a first station of the plurality of stations, wherein the first station is configured to transmit a first message with the first prefix and with the highest priority, during a predefined first access slot;
executing a second priority resolution for messages to be transmitted by the plurality of stations on the communications channel and which are assigned to a second prefix; and
transmitting of a second data frame by a second station of the plurality of stations, wherein the second station is configured to transmit a second message with the second prefix and with the highest priority of the second priority resolution, during a predefined second access slot,
wherein a time of a start of the first priority resolution and a time of a start of the second priority resolution are predetermined,
wherein a respective prefix of the messages to be transmitted by the plurality of stations is a property of a respective message that is known exclusively to a transmitting station of the plurality of stations that is transmitting the respective message.

15. The method as claimed in claim 14, wherein the respective prefix is an intrinsic property of the respective message.

16. The method as claimed in claim 14, wherein the respective prefix occupies at least one bit of the respective message and is arranged before the priority resolution space.

17. The method as claimed in claim 13, wherein the number of the $2^n$ subsystems is defined before the execution of the first priority resolution as a function of the number of the plurality of stations.

* * * * *